United States Patent [19]
Burgard

[11] Patent Number: 6,094,691
[45] Date of Patent: Jul. 25, 2000

[54] METHOD FOR THE IDENTIFICATION OF AN INTEGRATED CIRCUIT AND ASSOCIATED DEVICE

[75] Inventor: Francine Burgard, Grenoble, France

[73] Assignee: SGS-Thomson Microelectronics S.A., Gentilly, France

[21] Appl. No.: 09/082,645

[22] Filed: May 21, 1998

[30] Foreign Application Priority Data

Jun. 4, 1997 [FR] France ................................. 97 07078

[51] Int. Cl.[7] ........................ G06F 13/374; G06F 15/177
[52] U.S. Cl. ............................. 710/14; 713/1; 713/100; 710/8; 710/9; 710/10; 395/500.48; 709/221; 709/217
[58] Field of Search ..................................... 709/217, 220, 709/221; 710/8, 9, 10, 14; 713/1, 100; 395/500.48

[56] References Cited

U.S. PATENT DOCUMENTS

| | | | |
|---|---|---|---|
| 4,425,618 | 1/1984 | Bishop et al. ......................... | 712/226 |
| 4,788,637 | 11/1988 | Tamaru .................................. | 709/221 |
| 5,579,509 | 11/1996 | Furtney et al. ........................ | 395/500 |
| 5,619,724 | 4/1997 | Moore ................................... | 710/9 |
| 5,642,307 | 6/1997 | Jernigan ................................ | 365/103 |
| 5,721,781 | 2/1998 | Deo et al. .............................. | 380/25 |
| 5,832,483 | 11/1998 | Barker .................................... | 707/8 |
| 5,867,714 | 2/1999 | Todd et al. ............................. | 395/712 |
| 5,892,683 | 4/1999 | Sung .................................. | 395/500.48 |
| 5,915,112 | 6/1999 | Boutcher ................................ | 395/712 |
| 5,951,639 | 9/1999 | MacInnis ............................... | 709/217 |

FOREIGN PATENT DOCUMENTS 0 578 410 A2  6/1993  European Pat. Off. ........ G06F 11/00

*Primary Examiner*—Thomas C. Lee
*Assistant Examiner*—Tammara Peyton
*Attorney, Agent, or Firm*—Theodore E. Galanthay; Allen, Dyer, Doppelt, Milbrath & Gilchrist, P.A.

[57] ABSTRACT

A method is for the identification of an integrated circuit, and includes steps for writing, in a volatile register, a required number; the decoding, in the integrated circuit, of the required number and the reading of the identification number if the integrated circuit is not compatible with the required circuit or the reading of the required number if the integrated circuit is compatible with the required circuit. An identification device may include a non-volatile register, a volatile register, a decoder and a router.

23 Claims, 2 Drawing Sheets

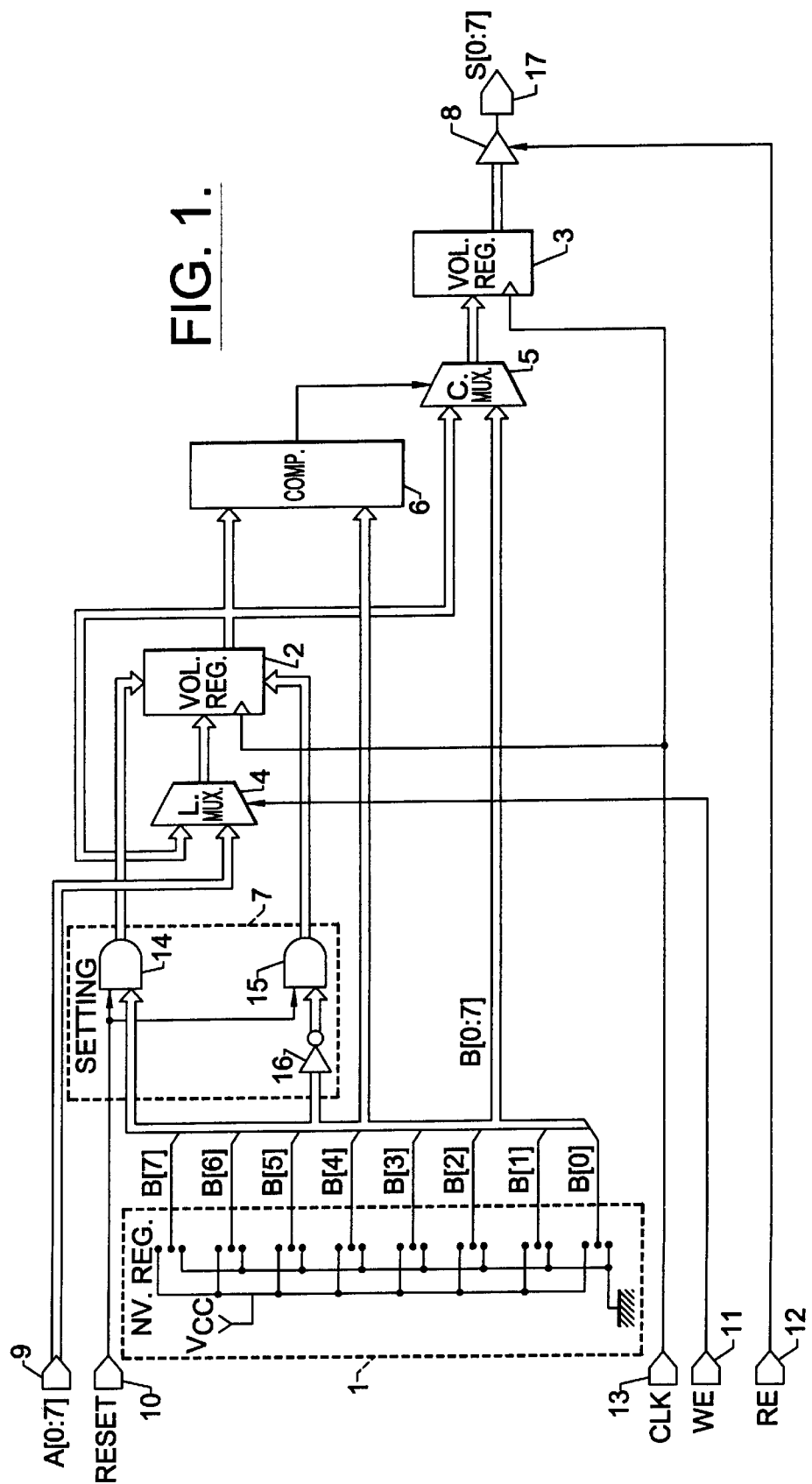

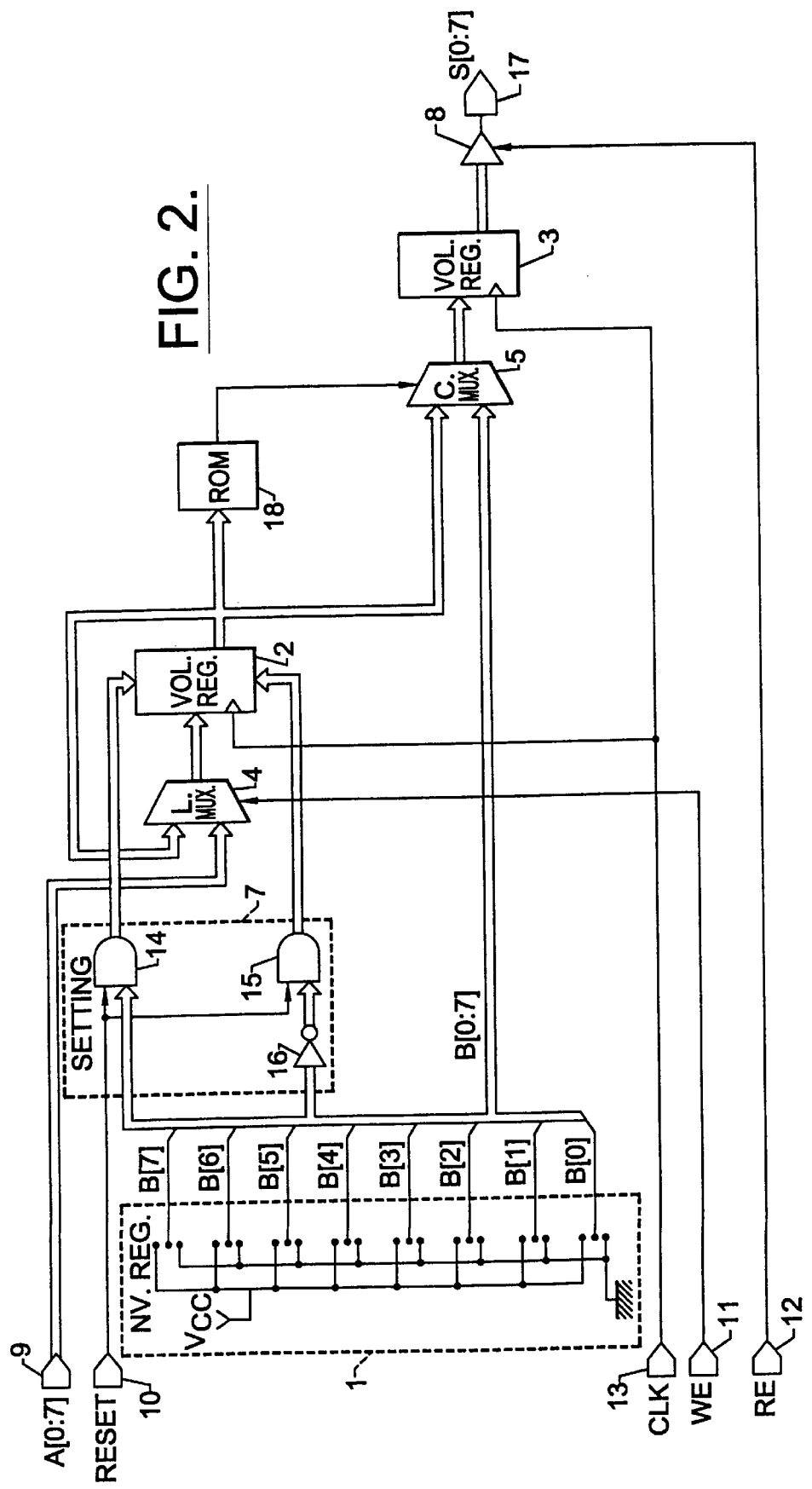

METHOD FOR THE IDENTIFICATION OF AN INTEGRATED CIRCUIT AND ASSOCIATED DEVICE

FIELD OF THE INVENTION

The present invention relates to a method for the identification of an integrated circuit and to a device associated with this method. More particularly, the invention relates to a large variety of integrated circuits used in microprocessor peripherals or in computer interfaces.

BACKGROUND OF THE INVENTION

Programmed systems most usually check their peripherals and interfaces when the system is started up and/or each time that the peripheral or interface is used. One of the phases of verification includes identifying the peripheral (or interface) and checking its integrity, i.e. ascertaining that it is properly constituted. For this purpose, the program system reads identification numbers of the integrated circuit or circuits providing the interface. The identification number may be provided by the manufacturer's number of the component and/or an identifier of the version of the component. The identification programs contained in the interface drivers read the identification numbers of the integrated circuits and compare them with a list of possible components.

The manufacturers of integrated circuits regularly modify their circuits to make them perform more efficiently. Depending on the integrated circuit, a new version appears every six months to every three years. In general (but not always) a new version of an integrated circuit is compatible with the previous one. Furthermore, the miniaturization of the circuits makes it possible to integrate an ever increasing number of functions into one and the same circuit. Thus, a new circuit may very well replace several older circuits. For example, an interfacing circuit for a serial communications port taking two or three protocols may be replaced by an interfacing circuit that uses several protocols including the required protocols. This enables the manufacturer to make only one circuit instead of about ten of them. Since the new component will automatically be produced in greater numbers than is the case with each of the previous circuits taken individually, the cost of the component will remain unchanged while at the same time enabling the manufacturer to meet the requirements of the market more efficiently, reduce his manufacturing costs and supply a more efficient component.

A problem then arises during the identification of the circuits in a programmed system because the new components may not be identified as corresponding to one of the possible components. Conventionally, the programs are updated to add new identification numbers. Although the updating of the program is not very difficult, its practical implementation raises problems of delays and the unexpected immobilization of equipment following a maintenance operation or a "standard" exchange of certain components.

SUMMARY OF THE INVENTION

Thus, an object of the invention is a method for the identification of an integrated circuit of a type comprising an indelibly stored identification number. The invention proposes a method of identification that provides a remedy to the problems of updating by software. The invention brings into question the entire procedure for the identification of the circuits to ensure an operation of updating incorporated in each circuit. The software will first of all write the requisite identification number into the integrated circuit and then read the manufacturer's number and, as the case may be, the circuit version identifier to verify compatibility.

The method preferably comprises the steps of: writing, in a volatile register, a required number corresponding to the identification of a required circuit; decoding, in the integrated circuit, the required number and the supply of an information element representing the compatibility of the integrated circuit with the required circuit; and supplying, during a reading of the identification number, the identification number if the integrated circuit is not compatible with the required circuit or of the required number if the integrated circuit is compatible with the required circuit.

An integrated circuit in accordance with the present invention preferably comprises an identification device including a non-volatile register that memorizes an identification number of the integrated circuit, a volatile register to memorize a required number corresponding to the identification number of a required circuit, decoding means to provide an information element representing compatibility between the integrated circuit and the required circuit, and a multiplexer for the routing, during a read operation, either of the required number or of the identification number of the integrated circuit as a function of the information element.

The invention proposes two advantageous embodiments. A first compact embodiment uses a comparator. A second embodiment that is more efficient uses a non-volatile memory.

To retain compatibility with the earlier programs, it is provided according to the invention that the identification number will be memorized in the volatile register during an initialization of the integrated circuit. For this purpose, the identification device comprises precharging means to enable the contents of the non-volatile register to be written into the volatile register in response to a zero-setting signal.

BRIEF DESCRIPTION OF THE DRAWINGS

The invention will be understood more clearly and other specific features and advantages shall appear from the following description, made with reference to the appended drawings, of which:

FIG. 1 shows a first embodiment of the invention, and

FIG. 2 shows a second embodiment of the invention.

DETAILED DESCRIPTION OF THE PREFERRED EMBODIMENTS

The drawing of FIG. 1 shows an identification circuit that can be used for integrated circuits that are always compatible with the previous integrated circuit. The circuit of FIG. 1 comprises a non-volatile register 1 designed to contain and supply a version identifier for a component series encoded for example on eight bits B[0:7]. This non-volatile register may be made as indicated in the drawing by means of straps that connect each output of the non-volatile register either to the supply voltage or to the ground (it is also possible to use ROM, PROM, EPROM and EEPROM cells). The illustrated circuit also includes a first volatile register 2 having one eight-bit data input, one asynchronous one-setting parallel input with eight bits, one asynchronous zero-setting parallel input with eight bits, one clock input and one eight-bit output.

The circuit further includes a second volatile register 3 having one eight-bit data input, one clock input and one eight-bit output, and one locking multiplexer 4 and one choice multiplexer 5 each having two eight-bit parallel inputs, one selection input and one eight-bit output. One comparator 6 is provided having a first and second eight-bit parallel input each, and an output that gives a binary signal in a first state if the word present at the first input is greater than the word present at the second input or in a second state if the word present at the first input is not greater than the word present at the second input.

The circuit also includes a setting circuit 7 having a word input, an instruction input, a one-setting word output, and a zero-setting word output. A three-state output buffer 8 is provided having a word input, a control input and a word output. A word input terminal 9 receives the word A[0:7]. The circuit also includes first to third control input terminals 10 to 12 respectively receive zero-setting signals RESET, write signals WE and read signals RE. A clock input terminal 13 receives the clock signal CLK, and a word output terminal 17 provides the word S[0:7].

In the present example, the setting circuit comprises first and second series of two-input AND gates 14 and 15 and one series of inverters 16, each series including, in the present example, of eight parallel-connected gates. A first one of the inputs of each of the AND gates of the first and second series 14 and 15 is connected to the first control input terminal 10 to receive the signal RESET. Each of the second AND gate inputs of the first series 14 is respectively connected to one of the outputs of the non-volatile register 1 to receive the word B[0:7]. Each of the inputs of the inverters of the series of inverters 16 is respectively connected to one of the outputs of the non-volatile register 1 to receive the word B[0:7].

Each of the second inputs of the AND gate of the second series 15 is respectively connected to one of the outputs of the series of inverters 16. The outputs of the first series of AND gates 14 form the one-setting word output of the setting circuit 7. The outputs of the second series of AND gates 15 form the output of the zero-setting word of the setting circuit 7.

The first of the inputs of the locking multiplexer 4 is connected to the word input terminal 9 to receive the word A[0:7]. The second of the inputs of the locking multiplexer 4 is connected to the output of the first register 2. The selection input of the locking multiplexer 4 is connected to the second control input terminal in order to receive the signal WE. When the signal WE is in a first state, for example at "one", the output of the locking multiplexer 4 is connected to its first input. When the signal WE is in a second state, for example at "zero", the output of the locking multiplexer 4 is connected to its second input.

The data input of the first register 2 is connected to the output of the locking multiplexer 4. The one-setting input of the first register 2 is connected to the one-setting word output of the setting circuit 7. The zero-setting input of the first register 2 is connected to the zero-setting word output of the setting circuit 7. The clock input of the first register 2 is connected to the clock input terminal 13 to receive the signal CLK.

The first of the inputs of the comparator 6 is connected to the output of the first register 2. The second input of the comparator 6 is connected to the output of the non-volatile register 1 to receive the word B[0:7].

The first input of the choice multiplexer 5 is connected to the output of the non-volatile register 1. The second input of the choice multiplexer 5 is connected to the output of the first register 2. The selection input of the choice multiplexer 5 is connected to the output of the comparator 6. When the signal present at the output of the comparator 6 is in the first state, for example at "one", then the output of the choice multiplexer 5 is connected to its first input. When the signal present at the output of the comparator 6 is in the second state, for example at "zero", then the output of the choice multiplexer 5 is connected to its second input.

The data input of the second register 3 is connected to the output of the choice multiplexer 5. The clock input of the second register 3 is connected to the clock input terminal 13. The word input of the buffer 8 is connected to the output of the second register 3. The control input of the buffer 8 is connected to the third control input 12 to receive the signal RE. The output of the buffer 8 is connected to the output terminal 17.

To explain the normal operation of the circuit of this FIG. 1, it is assumed that the signals are active when they are at "one" and inactive when they are at "zero". It is assumed that the control signals RESET, WE, RE are in an inactive state when the device is powered on.

Shortly after the device is powered on, the integrated circuit will perform different zero-setting operations. The zero-setting operations to be performed may include the zero-setting of the device of FIG. 1. To perform this zero-setting operation, the RESET signal is activated. When the RESET signal is activated, the outputs of the first and second AND gates series 14 and 15 will respectively give B[0:7] and the complement of B[0:7]. The first register 2 will be set asynchronously so as to contain the word B[0:7] and give it at its output. The write signal WE being inactive, the locking multiplexer 4 gives B[0:7] at its output. When the RESET signal becomes inactive, the word B[0:7] is re-recorded at each active edge of the clock CLK. The comparator 6 therefore compares B[0:7] with B[0:7] so that the choice multiplexer 5 gives B[0:7] at its output. This value is memorized at each clock cycle in the second register 3. Since the read signal RE is inactive, the output of the buffer 8 is in a state of high impedance.

If a prior art programmed system is involved, then the system will perform a simple reading of the identification number of the integrated circuit. The reading is expressed at the circuit by the activation of the read signal RE which will enable the word B[0:7] to be given at the output.

If, on the contrary, the integrated circuit is positioned in a programmed system adapted to the invention, then the system will first of all perform an operation to write the required number. The write operation will result in the presence of a required word A[0:7] at the word input terminal 9 and the activation of the write signal WE for a period that includes at least one first active edge of the clock signal CLK. Since the signal WE is active, the output of the locking multiplexer gives the word A[0:7] at its output. This word A[0:7] is recorded in the first register 2 as soon as the first active edge of the clock signal CLK appears.

The comparator 6 will give an active output signal if A[0:7]>B[0:7]. If not, it will give an inactive output signal. At a second clock cycle, the second register 3 will memorize B[0:7] if the output signal of the comparator 6 is active or A[0:7] if the output signal of the comparator 6 is inactive. After the second clock signal, the system may perform a reading of the identification number and it will be given either A[0:7] if the circuit corresponds to a version having a higher identifier number (therefore a more recent one) or B[0:7] if the circuit corresponds to a version that is older than the required version.

Those skilled in the art will note that the identification controlled by the circuit of FIG. 1 is limited to the number identifying a version of an integrated circuit. Furthermore, so that a circuit of this kind may function, the most recent version of a circuit should be compatible with all the previous versions.

The drawing of FIG. 2 shows a version of the circuit of FIG. 1 that takes up slightly more space but enables efficient operation without making it necessary to have full ascending compatibility with circuits of the same family. The circuit of FIG. 2 makes it possible to verify the compatibility also between integrated circuits belonging to different families.

The circuit of FIG. 2 differs from the circuit of FIG. 1 by the elimination of the comparator 6 and of the connections to the comparator and by the addition of a non-volatile memory 18, for example, of the ROM type. The memory 18 is shown in a simplified manner and has an address input, for example, on eight bits and a data output, for example on one bit. The address input of the memory 18 is connected to the output of the first register 2. The data output of the memory 18 is connected to the selection input of the choice multiplexer 5. To reduce the access time of the circuit of FIG. 2, the memory 18 may work asynchronously. In other words, the first register 2 is used as an address register of the memory 18.

The memory 18 must contain, in each storage element, a bit which indicates whether the integrated circuit containing the circuit of FIG. 2 is compatible with another integrated circuit whose identification number corresponds to the address of the storage element. More generally, the information element placed at an address corresponding to the required number should represent the compatibility between the required circuit and the integrated circuit.

Thus, with a program system adapted to the invention, the system will first of all perform an operation to write the required number A[0:7] in the first register 2 as soon as the first active edge of the clock signal CLK appears. The memory will decode the address corresponding to A[0:7] and, at the end of a period of propagation smaller than a cycle of the clock signal CLK, it will give a signal that is active if the integrated circuit is not compatible or inactive if the integrated circuit is compatible. At a second clock cycle, the second register 3 will memorize B[0:7] if the integrated circuit is not compatible or A[0:7] if the integrated circuit is compatible. The system may, after the second clock cycle, perform an operation to read the identification number and, as a word S[0:7], it will be given either A[0:7] if the integrated circuit corresponds to a compatible version or B[0:7] if the circuit corresponds to an incompatible version.

Of course, those skilled in the art will understand that the invention is not limited to the embodiments described. Many modifications may be performed without in any way depart- Certain elements are not absolutely necessary for the making of the invention. Thus, the locking multiplexer 4 is used to synchronize the loading of A[0:7] in the first register 2. The locking multiplexer may be eliminated if a register with a validation input is used or if the write signal is used as the clock signal of the first register.

The second register 3 is used to memorize either the identification number or the required number as a function of the information. This second register is used to stabilize the output signals to prevent possible glitches that might jeopardize the efficient operation of the integrated circuit. However, if the integrated circuit is designed to withstand these glitches, it is quite possible to eliminate the second register 3.

The buffer 8 has is useful when the output of the device is connected to a multiple-user bus. The buffer 8 may be eliminated if a dedicated bus is used.

The setting circuit 7 provides precharging means to enable the writing of the contents of the non-volatile register 1 in the first volatile register 2 in response to the zero-setting signal RESET. These precharging signals are used to ensure compatibility with prior art programmed systems which perform only a reading of the identification number. It goes without saying that these precharging means can be eliminated if the integrated circuit is designed for use only in systems using the identification method of the invention.

That which is claimed is:

1. A method for identification of an integrated circuit of a type comprising an indelibly stored identification number, the method comprising the steps of:

writing, in a volatile register, a required number corresponding to an identification number of a required circuit;

decoding, in the integrated circuit, the required number and supplying an information element representing the compatibility of the integrated circuit with the required circuit; and furnishing, during a reading of the identification number, the indelibly stored identification number of the integrated circuit which remains unchanged during the life thereof if the integrated circuit is not compatible with the required circuit or the required number if the integrated circuit is compatible with the required circuit.

2. A method according to claim 1, wherein the step of decoding comprises comparing the required number with the identification number.

3. A method according to claim 1, wherein the step of decoding comprises reading in a non-volatile memory inforis not compatible with the required circuit or the required number if the integrated circuit is compatible with the required circuit.

6. A method according to claim 5, wherein the step of decoding comprises comparing the required number with the identification number.

7. A method according to claim 5, wherein the step of decoding comprises reading in a non-volatile memory, information placed at an address corresponding to the required number representing compatibility between the required circuit and the integrated circuit.

8. A method according to claim 5, wherein the identification number is stored in the first register during an initialization of the integrated circuit.

9. A method for identification of an integrated circuit of a type comprising an identification number, the method comprising the steps of:

writing, in a first register, a required number corresponding to an identification number of a required circuit;

decoding, in the integrated circuit, the required number by comparing the required number with the identification number and supplying an information element representing the compatibility of the integrated circuit with the required circuit; and furnishing, during a reading of the identification number, the identification number of the integrated circuit which is indelibly stored and which remains unchanged during the life the integrated circuit if the integrated circuit is not compatible with the required circuit or the required number if the integrated circuit is compatible with the required circuit.

10. A method according to claim 9, wherein the identification number is stored in the first register during an initialization of the integrated circuit.

11. A method for identification of an integrated circuit of a type comprising an identification number, the method comprising the steps of:

writing, in a first register, a required number corresponding to an identification number of a required circuit;

decoding, in the integrated circuit, the required number by reading in a non-volatile memory information placed at an address corresponding to the required number representing compatibility between the required circuit and the integrated circuit, and supplying an information element representing the compatibility of the integrated circuit with the required circuit; and furnishing, during a reading of the identification number, the identification number of the integrated circuit which is indelibly stored and which remains unchanged during the life the integrated circuit if the integrated circuit is not compatible with the required circuit or the required number if the integrated circuit is compatible with the required circuit.

12. A method according to claim 11, wherein the identification number is stored in the first register during an initialization of the integrated circuit.

13. An integrated circuit having an identification feature and comprising:

a non-volatile register for indelibly storing an identification number of said integrated circuit that remains unchanged during the life thereof;

a volatile register to store a required number corresponding to an identification number of a required circuit;

a decoder for providing an information element representing compatibility between the integrated circuit and the required circuit; and a multiplexer for routing, during a read operation, either the required number or the identification number of the integrated circuit as a function of the information element.

14. An integrated circuit according to claim 13, wherein said decoder comprises a comparator receiving, at a first input, the identification number from the non-volatile register and, at a second input, the required number from the volatile register; and wherein the comparator gives the information element at an output as a function of the result of a comparison between the identification number and the required number.

15. An integrated circuit according to claim 14, further comprising an address bus connected to said decoder, wherein said decoder comprises a non-volatile memory receiving via said address bus the required number from the volatile register; and wherein said non-volatile memory includes data elements representing different cases of compatibility of the integrated circuit to provide the information element on an output.

16. An integrated circuit according to claim 14, further comprising precharging means for enabling contents of the non-volatile register to be written in the volatile register in response to a zero-setting signal.

17. An integrated circuit according to claim 14, further comprising a storage register to store either the identification number or the desired number as a function of the information element.

a router for routing, during a read operation, either the required number or the identification number of the integrated circuit as a function of the information element.

18. An identification device for an integrated circuit comprising:

a first register for indelibly storing an identification number of the integrated circuit that remains unchanged during the life thereof;

a second register to store a required number corresponding to an identification number of a required circuit;

a decoder for providing an information element representing compatibility between the integrated circuit and the required circuit; and a router for routing, during a read operation, either the required number or the identification number of the integrated circuit as a function of the information element.

19. An identification device according to claim 18, wherein said decoder comprises a comparator receiving, at a first input, the identification number from the first register and, at a second input, the required number from the second register; and wherein the comparator gives the information element at an output as a function of the result of a comparison between the identification number and the required number.

20. An identification device according to claim 18, further comprising and address bus, wherein said decoder comprises a memory receiving via said address bus the required number from the first register; and wherein said memory includes data elements representing different cases of compatibility of the integrated circuit to provide the information element on an output.

21. An identification device according to claim 18, further comprising precharging means for enabling contents of the first register to be written in the second register in response to a zero-setting signal.

22. An identification device according to claim 18, further comprising a third register to store either the identification number or the desired number as a function of the information element.

23. An identification device according to claim 18, wherein said first register comprises a volatile register and said second register comprises a non-volatile register.

* * * * *